INVENTOR.
JEAN C. J. O. E. EMOND

Jan. 6, 1970   J. C. J. O. E. EMOND   3,488,528
INTEGRATED CIRCUIT
Filed April 14, 1967   10 Sheets-Sheet 5

INVENTOR.
JEAN C. J. O. E. EMOND
BY
Frank R. Trifari
AGENT

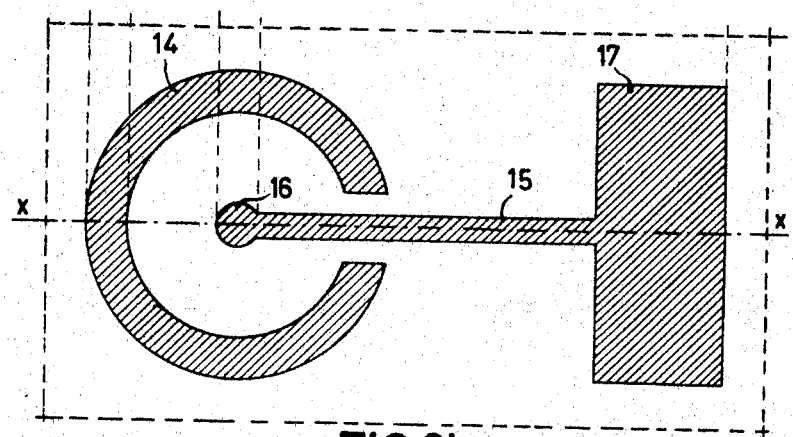
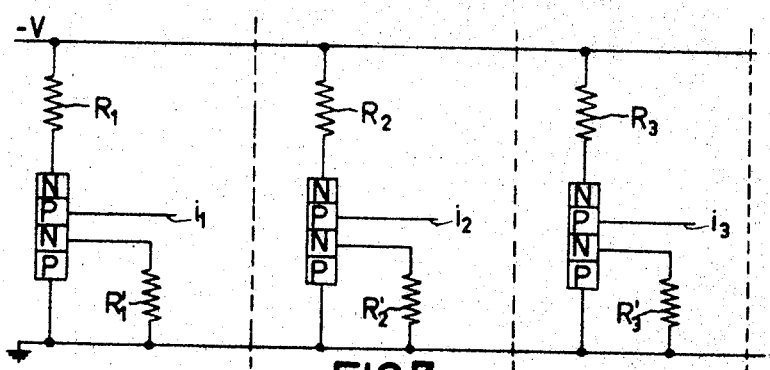
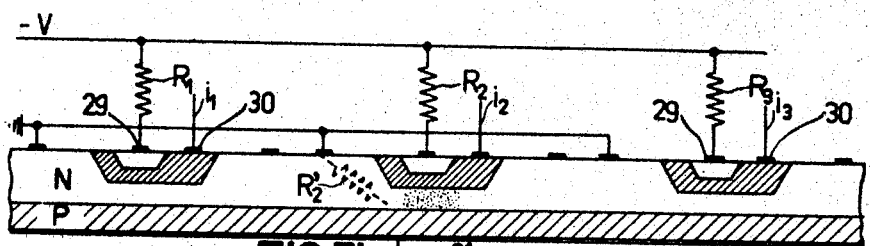

Jan. 6, 1970   J. C. J. O. E. EMOND   3,488,528
INTEGRATED CIRCUIT
Filed April 14, 1967   10 Sheets-Sheet 8
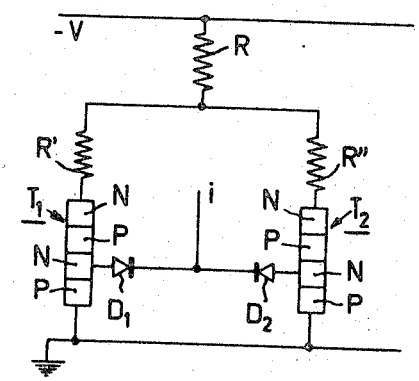
FIG.11
FIG.12a-1
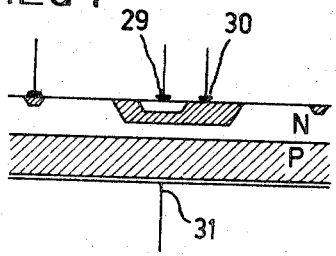
FIG.12a-2
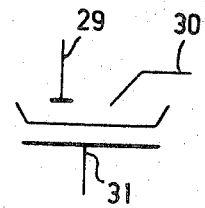
FIG.12b-1
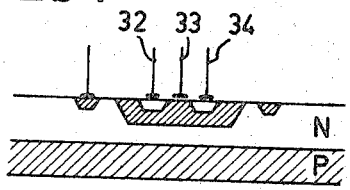
FIG.12b-2
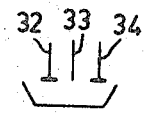
FIG.12c-1
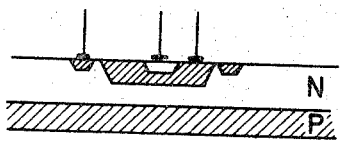
FIG.12c-2
INVENTOR.
JEAN C. J. O. E. EMOND
BY
AGENT

United States Patent Office 3,488,528
Patented Jan. 6, 1970

3,488,528
INTEGRATED CIRCUIT
Jean Claude Joseph Oscar Edmond Emond, Bruxelles, Belgium, assignor, by mesne assignments, to U.S. Philips Corporation, New York, N.Y., a corporation of Delaware
Filed Apr. 14, 1967, Ser. No. 630,881
Claims priority, application Netherlands, May 6, 1966, 6606164
Int. Cl. H03k 19/08
U.S. Cl. 307—303    20 Claims

ABSTRACT OF THE DISCLOSURE

An integrated circuit built in a common semiconductor wafer provided with means for electrically isolating at least some of the circuit elements from one another. This is accomplished by providing an electrically conductive ring on or in the surface of the semiconductor so as to surround or substantially surround one of the circuit elements, the semiconductor regions between the conductive ring and the circuit elements to be isolated constituting resistances, and the conductive ring being connected to an external potential, for instance, ground. The conductive ring forms a kind of Faraday cage around the circuit element, with the semiconductor internal resistance taking up any voltage differences that may occur during the operation of the circuit.

---

The invention relates to any easy insulation between semiconductor elements integrated in the same wafer-shaped semiconductor body and forming together part of an electronic circuit. The term semiconductor element or circuit element is to denote herein not only separate active elements (for example transistors) or passive elements (for example resistors) but also integrated, functional compositions of such elements.

It is known that complete electronic circuit arrangements can be applied either to a substrate of ceramic material, for example, glass (for instance by deposition from the vapour phase) or be diffused into a single silicon wafer. This has the advantage that the circuit arrangement may be extremely small, since photographic methods may be employed for making the masks to be used with the diffusion or the deposition from the vapour phase. In this way great numbers of identical circuits may be provided on one substrate or in one silicon wafer in one manufacturing process so that the cost price of such an arrangement can be drastically reduced. For some arrangements it is desirable to have minimum dimensions.

However, the application of semiconductor elements to a substrate and the diffusion of a great number of elements into a silicon wafer involve difficulties. One of them resides in the fact that, when carrying out a given diffusion, the former diffusions are reactivated and that with each diffusion so many previous diffusions have to be taken into account that degrees of freedom are lacking. It is therefore endeavoured to manufacture the arrangement so that only the semiconductor elements using pn-junctions are diffused into a silicon wafer and the remainder of the arrangement (comprising the conductors, resistors and the like) is applied to a substrate, to which the silicon wafer with the remainder of the circuitry is subsequently soldered.

Slicon wafers containing a plurality of semiconductor elements of the same circuitry are also known. The various zones of each semiconductor element are diffused into such a wafer. The term "zone" is to denote herein a region of a given conductivity type bounded by the outer surface and by regions of the opposite conductivity type. For example, a pnp-transistor comprises two p-type zones separated from each other by an n-type zone. However, all zones of each semiconductor element are diffused into the silicon wafer. If no special measures were taken, one or more zones of a given semiconductor element might be electrically connected across the silicon material to one or more other zones of the same or of another element, whereas this electrical connection might be undesirable for the satisfactory operation of the arrangement to be obtained. If, for example, two transistors are diffused into the same silicon wafer, the bases of the two transistors may be connected to each other through the silicon material of the support, so that these transistors cannot serve for use in an arrangement of two transistors whose bases should not be interconnected. Therefore in this arrangement the connection between the two bases across the silicon is undesirable. Each potential variation of one base will undesirably affect through said path the other base, so that the arrangement cannot operate satisfactorily. In general, the provision of a plurality of semiconductor elements in the same semiconductor wafer will give rise to connections between the zone of the semiconductor elements. If these elements have to be employed for establishing a circuit diagram, some of said connections are not desired in the diagram and wll even be prohibitive for a good operation. Through such a connection a potential variation in one zone will affect the potential of a further zone in a manner not desired for the satisfactory operation of the arrangement. Consequently undesired influences of potentials are operative between the zones of the semiconductor elements arranged in the same semiconductor wafer. These influences are exerted through paths of connection which are detrimental to the satisfactory operation of the circuitry.

A first known method to avoid these undesirable influences of potential comprises the steps of diffusing all zones of each semiconductor element into a region reserved for this element in a semiconductor wafer of a given conductivity type and the application of such a high or low potential to this wafer with respect to the potentials of the arrangement with which these elements are associated that the pn-junction between each element and the remainder of the wafer is cut off. This solution involves two difficulties: on the one hand a minor defect of the crystal at the level of the blocked junction may destroy the insulating effect of the whole junction and, moreover, such a junction has a given capacitance so that high-frequency alternating currents can flow unhindered from one semiconductor element to the other so that the insulation between the elements is imperfect for alternating voltages of high frequency.

Further methods have been developed for avoiding the undesirable influences of potentials. The semiconductor elements are no longer surrounded by a blocked junction, but simply by a layer of non-conductive material. If this layer is not too thin, the A.C. insulation is improved. In the article of J. W. Lathrop: "The Status of Monolythic and Thin Film Circuits" in "Electronic Industries," June 1965, pages 41, 42 a few methods are described for obtaining such a non-conductive layer. However, this requires a sequence of operations (etching, oxidizing, epitaxial growth, grinding off), some of which may be very critical. In the same article a few methods are described by which these operations may be rendered less critical. However, this requires a greater number of operations.

A further step consists in etching away the semiconductor material between the semiconductor elements, so that only the elements themselves are left, holding to each other by their metallic connections previously applied to the semiconductor wafer. This step is also described in said article. This vulnerable circuitry has to be connected in this form to the further external elements and be rendered mechanically resistant, for example by casting resin, or first the mechanical rigidity may be provided, after which the connection to the external elements can be established. In the first case the work is delicate and in the second case it is difficult to obtain the required rigidity without covering the contacts to be connected to the external elements.

The invention has for its object to provide an improved electrical insulation for a plurality of semiconductor elements of an electronic circuit arrangement.

The invention has furthermore for its object to improve this insulation in a ready manner.

It will be seen that by carrying out this invention the number of diffusion operation sfor given arrangements can be reduced or that at least one diffusion mask may be dispensed with.

It will furthermore be seen that in certain other cases the characteristics of the elements thus insulated can be better predicted.

According to the invention at least one good conductor is provided on or in the semiconductor body, which conductor, when connected to an external potential, separates electrically one integrated element or a subgroup of elements from the subgroup of the further elements in a sense such that the body constitutes a resistance joint between the conductor and this integrated element or at least one element of the first-mentioned subgroup of elements and furthermore at least one element of the subgroup of further elements.

Each variation of potential in one of the two subgroups is completely taken up by the resistance connecting this subgroup to the good conductor, so that the other subgroup is not subjected to any variation of potential and is therefore electrically separated from the first subgroup. All points in the region close to the good conductor are substantially at the potential of this conductor, since the resistance of the path from such a point to the conductor is negligible owing to the close proximity. Therefore, between the two subgroups a region of the semiconductor body is at the external potential, which screens the two subgroups one from the other. This is virtually a type of screening similar to that provided by a conductive metal grid brought to a given potential for separating two regions from each other. Whereas by the prior art the subgroups are separated from each other by a completely insulating layer, they are separated in accordance with the invention by a conductive layer at the external potential. This has the advantage that the conductive layer may have apertures and defects provided the region in the close proximity remains at the external potential. The insulating layer of the prior art must not have any defect. Moreover, the technique of insulating by a blocked pn-junction allows for a deficiency in this junction. Moreover, the A.C. insulation is considerably improved by the screening technique according to the invention. In fact, the conductive layer constitutes a screening region separating the subgroups electrically one from the other. A similar screening region may, however, be formed by a good conductor applied, for example, to the surface, so that the necessity of providing a conductor in the semiconductor body is avoided.

It is moreover possible to ensure that the resistance connection between this conductor and each subgroup forms a resistor designed in the circuit arrangement to be produced. By carrying out the invention this resistor is therefore integrated in advance.

The invention will now be described more fully with reference to a few embodiments and the accompanying drawing.

FIG. 6 illustrates a special method of applying the contacts.

FIG. 11 shows a variant of the arrangement of FIG. 8.

FIG. 12 is a symbolic representation of the semiconductor elements mentioned in the specification.

Figure 1A:
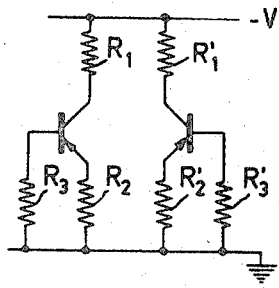
FIG. 1(a–e) illustrates a comparison between the integration of a circuit arrangement by known methods and by a method according to the invention.
Figure 1B:
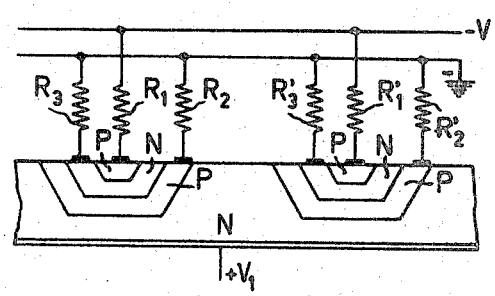

FIG. 1a shows a simple arrangement to be integrated in one semiconductor body, for example, a silicon wafer. This arrangement comprises two pnp-transistors. In this arrangement it is not desirable for the emitter-, base- or collector zone of a transistor to have another connection to one of the zones of the other transistor than via the resistors shown. These transistors are diffused into one silicon wafer and the undesirable interactions of the zones of the two transistors may be avoided by the known method of the blocked pn-junctions. This embodiment is shown in FIG. 1b. The external resistors $R_1$, $R_2$ and $R_3$ are connected to the various zones as indicated in the figure. In this manner the circuit arrangement of FIG. 1a is obtained. It being supposed that the two transistors have the same characteristics, it will be apparent that the application of the zones requires three diffusion processes, one for the two emitter zones, one for the two base zones, diffused into a corresponding emitter zone, and one for two collector zones, diffused into the corresponding base zones. It will furthermore be obvious that each diffusion process requires a mask. The common n-zone could be dispensed with, if it were not required as a support for the two transistors. This zone is polarised in the reverse direction by a voltage $+V_1$.

Figure 1C:
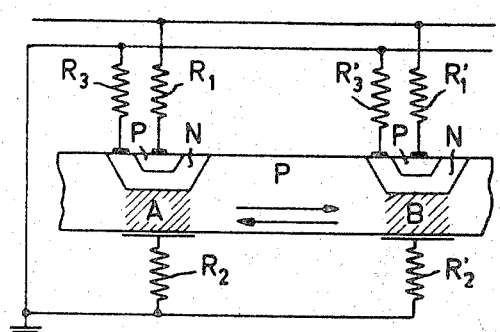
Figure 1D:
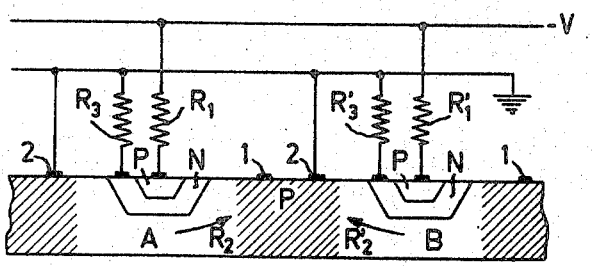
Figure 1E:
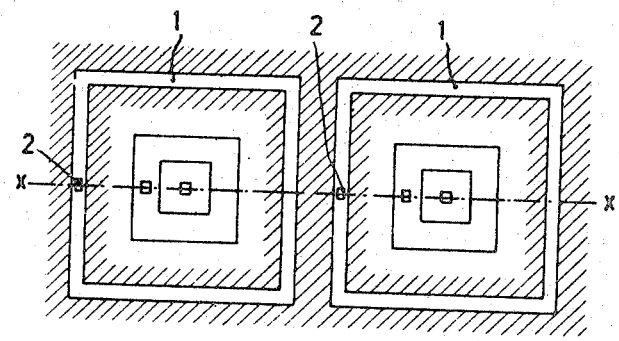

Obviously the tendency is to eliminate this almost redundant n-zone together with the voltage source $+V_1$. If this could be realized by constructing the emitter zones of the two transistors as a common zone (FIG. 1c), only two diffusion processes and only two diffusion masks would be required. However, in this case an undesirable connection would be established (indicated by the arrows), along which the potential in A could affect the potential in B. According to the circuit diagram this is allowed only along the resistors $R_2$ and $R'_2$ in series. Without the application of the invention this embodiment can therefore not be made in practice. The embodiment according to the invention is shown in FIG. 1d and 1e. 1e is a plan view of the silicon wafer and FIG. 1d is a sectional view taken on the dot-and-dash line X—X in FIG. 1e. Each semiconductor element is surrounded on the surface of the wafer by an aluminium ring 1, applied from the vapour phase, which ring establishes a satisfactory ohmic contact with the wafer and is subsequently connected to earth in the arrangement through a contact 2, shown diagrammatically. In this manner each semi-conductor element is surrounded by a kind of Faraday cage, so that the potential in A can no longer affect the potential in B via the silicon wafer. Each transistor is surrounded by a good conductor, which is connected to an external potential, earth potential and separating the transistor electrically from all further elements on the silicon wafer. The semiconductor body itself establishes a resistance connection (for example $R_2$) between the transistor (for example, the emitter of the left-hand transistor) and the good conductor (for example, the left-hand conductor 1) and a further resistance connection (for example $R'_2$) between this conductor and the other transistor (the emitter of the right-hand transistor). These two resistors $R_2$ and $R'_2$ are thus integrated in the semiconductor body when the invention is carried out, so that they need not be provided externally.

By the measure according to the invention the connection between A and B is not eliminated, as would be the case, if the two transistors were separated by an insulating layer, but this connection is not harmful and it is furthermore employed for integrating in addition a few resistors. This measure reduces the number of required diffusions and requires itself no additional operation, since the aluminium ring is applied from the vapour phase simultaneously with the base nad collector contacts. Only the mask is different.

This "Faraday cage" effect therefore eliminates any action of the potential of one emitter on the other. The does not apply to the embodiment shown in FIG. 1b. The blocked pn-junction between the emitter and the common n-zone has a capacitance and an alternating current of high frequency can flow from one emitter to the other.

Moreover, such a blocked pn-junction should not have any defective place, which is blocked little or not at all, since otherwise the effect of the whole junction is annihilated. The same applies when the transistors are separated from each other by an insulating layer. This layer should not have any conductive leak. These problems are not found or they are strongly reduced in an embodiment according to the invention.

It should be noted that it is not necessary for the two rings to be at the same potential. However, if the potential of the two rings is not the same, a redundant current, which is not undesirable for the circuit, flows between the two rings. Therefore, a circuit in which the rings do not have the same potential, is not of the same advantage, but it also lies in the scope of this invention.

Figure 2A:
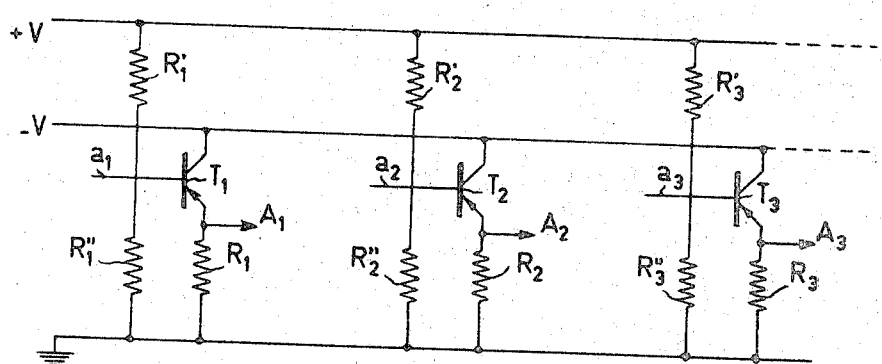
FIG. 2 shows a second embodiment of the integrated form of sequence of emitter followers according to the invention.

A further example of a circuit according to the invention is shown in FIG. 2a. This arrangement comprises a plurality of emitter followers, each of which converts a signal $a$ into a signal A of low output impedance. Each emitter follower comprises in this case a pnp-transistor T, an earth-connected emitter resistor R and two polarizing resistors R' and R", connecting to a positive potential $+V$ and to earth. The collector is directly connected to a negative potential $-V$. The input signal $a$ is applied to the base and the output signal A is derived from the emitter.

Figure 3:
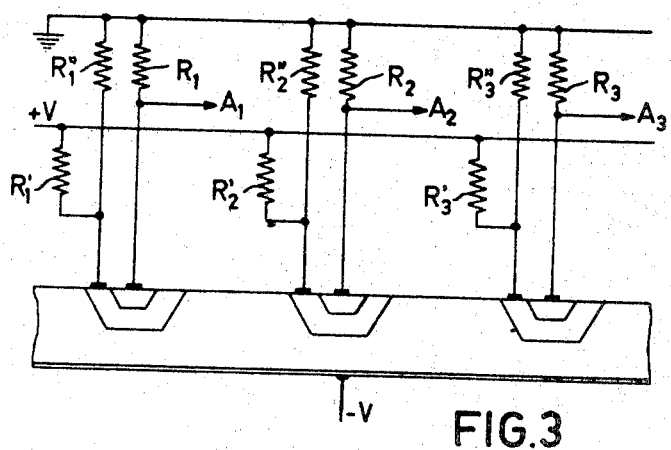
FIG. 3 illustrates the known methods of integrating these emitter followers.

In this arrangement the undesirable interaction could be avoided by the method of the blocked pn-junction. As in the preceding example, it may be asked whether the almost redundant n-zone with the corresponding voltage source could be eliminated. This is possible in this case, since the three collectors can be constructed in common. Ths embodiment is shown in FIG. 3. One zone, the collector zone, can thus be constructed in common. The blocked pn-junctions are therefore not required.

Figure 2B:
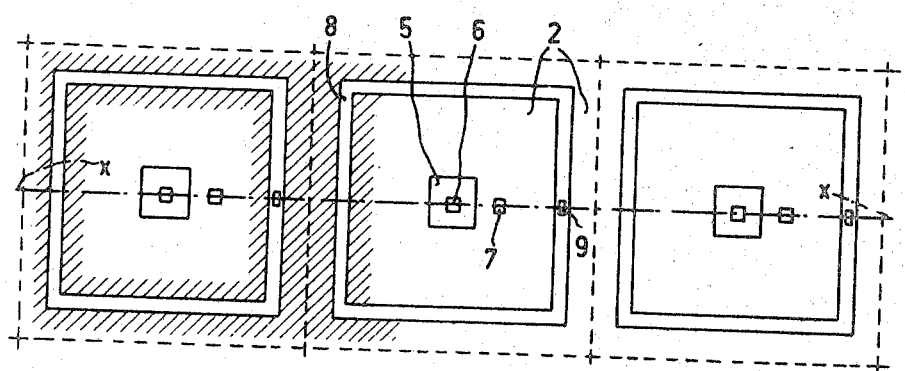
Figure 2C:
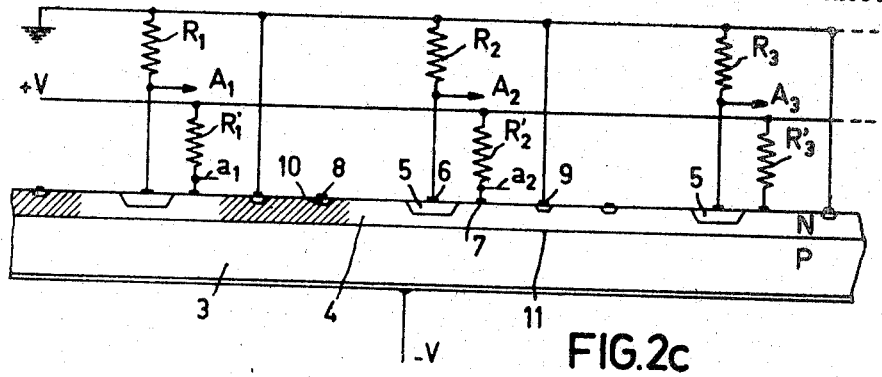

The application of the invention provides the possibility of constructing a second zone in common, i.e. the base zone. Thus a further diffusion mask becomes superfluous. The embodiment according to the invention is shown in FIGS. 2b and 2c. FIG. 2b is a plan view of a silicon plate and FIG. 2c is a sectional view taken on the dot-and-dash line X—X in FIG. 2b. The collector zones 3 and the base zones 4 are in common. Into this base zone are then diffused the emitters 5 separately. The emitters are connected each through an ohmic contact 6 (shown schematically) to the output wire A and to the external emitter resistor R, which is otherwise connected to earth. In the closest possible vicinity of each active part of the common base zone (that is to say most closely to each part operating as a base for each transistor) an ohmic contact 7 is established, along with the base is connected to the input $a$ and to the external base resistor R', which is otherwise connected to the positive potential $+V$. Each collector zone is surrounded on the wafer surface by an aluminium ring 8, applied from the vapour phase, and establishing a satisfactory ohmic contact with the wafer and brought to earth potential through a contact 9 (shown schematically).

It will be apparent that in the common region 3 on the lower side of the wafer insulation problems do not appear. These problems are, however, found in the region 4 on the upper side and they are solved by forming in the region 4 a screening range (cross-hatching in the figure), which is brought to the external potential.

The distances and the dimensions of the ring are chosen so that the resistances across the semiconductor body between the contact 7 and the corresponding contact 9 are equal to R". This connection then constitutes also an integrated resistor of the circuit itself.

In order to obtain a satisfactory ohmic contact on n-type material, donor impurities may, if desired, be diffused, so that a very good conductive annular zone 10 is obtained.

In this embodiment it will be apparent that a screening range may touch the pn-junction 11. The circuit may then be such that the voltage in this boundary region across the pn-junction is in the pass direction. This is unobjectionable for the operation of the circuit, but in this case useless power is taken from the supply source. Particularly advantageous are those circuits in which this boundary region is biassed in the reverse direction. This applies to the circuit shown in FIG. 2a. More advantageously the circuit is constructed so that this boundary region is left without voltage.

Figure 4A:
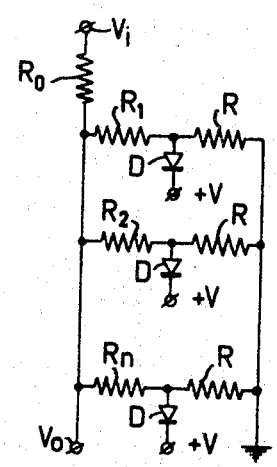
FIG. 4 illustrates the application of the invention to a functional generator.
Figure 4B:
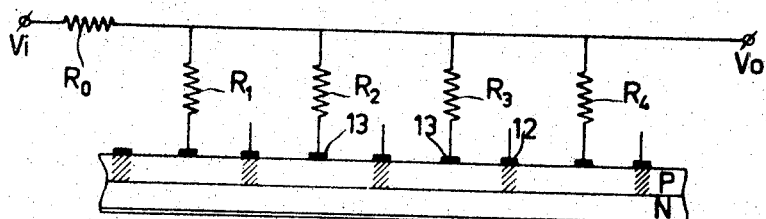
Figure 4C:
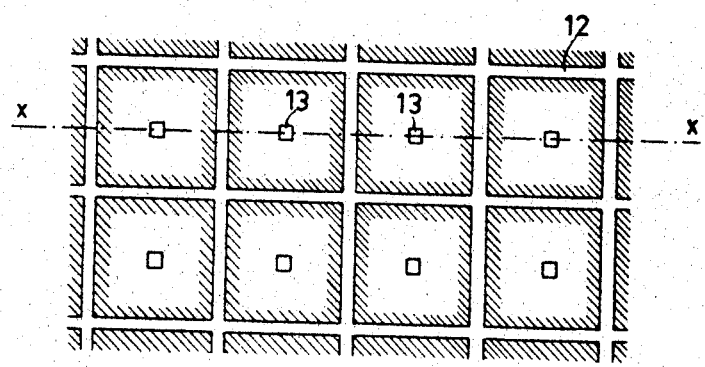

In a third embodiment it is shown that separate zones do no longer appear in certain integrated circuits. This embodiment employs the functional generator shown in FIG. 4a. This generator is formed by a sequence of diodes D, the n-side being connected to a potential $+V$ and the p-side through a resistor R to earth. The p-side of each diode is furthermore connected to the output of the circuit through a resistor ($R_1$ to $R_n$), which is different for each diode and which may be constructed in the form of a potentiometer. The value of these resistors determines the slopes and the bending points of the curves representing the output voltage $V_o$ as a function of the input voltage $V_i$. This embodiment according to the invention is shown in FIGS. 4b and 4c. FIG. 4c is a plan view of part of the silicon wafer and FIG. 4b is a sectional view taken on the dot-and-dash line X—X of FIG. 4c.

FIG. 4c shows that a great number of diodes may be arranged side by side on the silicon wafer. The n-zones of these diodes are constructed in common and also the p-zones are joined in one zone. The interactions of the potential between the p-zone of each diode are avoided by the conductive network 12 of square meshes, only one point of which is connected to earth. It will be apparent that in certain embodiments part of the conductive ring, termed hereinafter the screening, may form part of an adjacent ring and that no separate zones are any longer diffused, so that no diffusion mask is required. As in the preceding embodiment the conductive mesh network is applied through the same mask simultaneously with the contacts 13. The resistors $R_1$ and $R_2$ are connected to said contacts. The parallel combination of these resistors, in series with the resistor $R_o$, may be applied to glass, for example.

It may be questioned whether the meshes of the network will not become so small for obtaining given low values of R that the contacts 13 to be arranged inside thereof will be too small for soldering a wire thereto, so that the application of the invention would not be possible. The answer to this question involves two further particular aspects of the invention, which may sometimes be very important.

Figure 5:
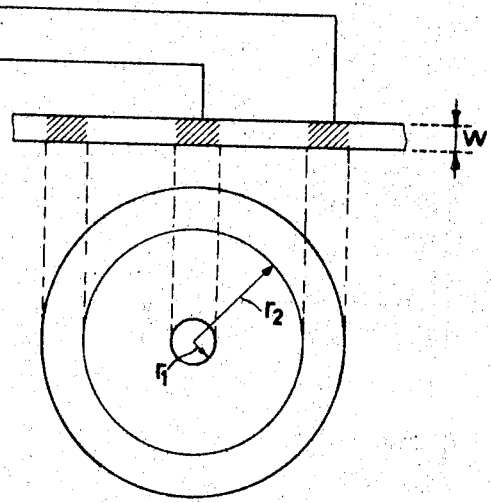
FIG. 5 shows two contacts on a silicon layer between which the resistance is measured.

The resistance between a circular ring applied by deposition from the vapour phase (FIG. 5), having an inner diameter $2r_2$ and a concentric, circular disc (diameter $2r_1$) inside said ring, the disc and the ring being deposited from the vapour phase on a semiconductor layer of a resistivity $p$ and a thickness W is given by approximation by the formula:

$$R = \frac{p}{2W} \ln \frac{r_2}{r_1}$$

The resistor R is therefore dependent only upon the ratio between the two radii. If given values of R have to be attained, it is not the dimensions, but the ratios which are determinative. The value of the resistor R does therefore not impose too large or too small dimensions on the screening. This is a first aspect of the invention. With a semiconductor of $p = 10$ ohm. cm., W of about $10^{-4}$ m and $r_2/r_1 = 5$, the resistor R has a value of about 10K ohms.

With a required minimum diameter of $2r_1$ of the central contact, the required value of R may be so small that the inner diameter $2r_2$ of the screening is very small. On the other hand the central contact disc is so small that a wire can no longer be soldered thereto. If other integrated circuits in a silicon wafer, the problem is involved that an ohmic contact is too small for fastening a wire thereto, a conductor is arranged in known manner on the insulating SiO₂ layer covering the silicon wafer, this conductor being connected on one side to the small ohmic contact and on the other side terminates in a large conductive surface to which the wire can be soldered. In the embodiments shown in FIGS. 4 and 5 this cannot be carried out without further steps. The screening is so small that said large surface cannot be accommodated therein. The conductor had to extend from a region inside the screening ring to a region beyond the screening ring, so that it had to cross the ring. The crossing is a contact between the conductor and the screening ring. A short-circuit could be avoided by covering the ring by an insulating layer.

In this respect the second aspect of the invention becomes valuable: for a complete embracing of a semiconductor element by a screening region it is not necessary for the screening itself to be complete closed. This is the great advantage of the use of a screening ring instead of the insulation method for avoiding the interaction of potentials. With the insulation method the insulating layer should not exhibit any aperture or deficiency. With a screening ring the screening layer is allowed to have apertures. FIG. 6 illustrates that the screening ring 14 is not completely closed so that the conductor 15 may extend from the small contact 16 inside the screening region to a larger contact 17 beyond said region without making a short-circuit with the screening ring and without the need for coating the ring with an insulating layer. FIG. 6b is a plan view of the silicon wafer and FIG. 6a is a sectional view taken on the line X—X. FIG. 6a shows the insulating SiO₂ layer under the conductive layer in cross-hatching and the screening region in dots. FIG. 6b shows the conductive layer in cross hatching and the SiO₂ layer, which appears at the surface at all further places without further indications. If the screening rings are small, the ohmic contacts 15, 16, 17 may be applied simultaneously with the screening ring according to this second aspect. Moreover, two ohmic contacts may in this way be connected to each other inside two different screening rings. Where the conductor extending across the SiO₂ surface crosses the rings, the latter are interrupted.

Figure 7C:
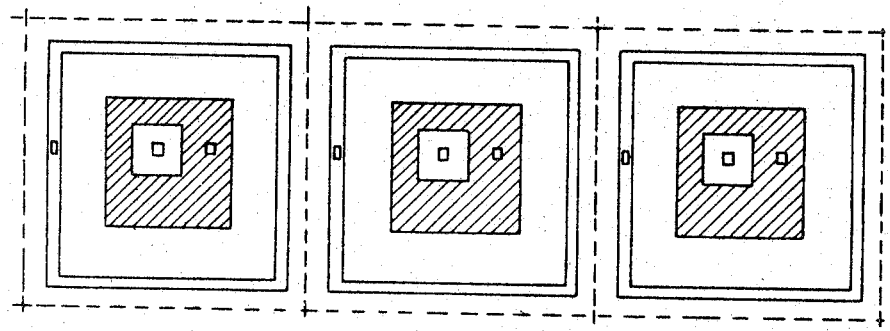
FIG. 7 illustrates the application of the invention to a sequence of pn-pn semiconductors.

A further embodiment is shown in FIG. 7. The circuit is illustrated in FIG. 7a and comprises a sequence of pnpn-semiconductors, the external p-zone of which is connected to earth and the adjacent n-zone of which is also connected to earth through a resistor. The other outer zone is connected to a resistor, the other end of which is connected to the voltage supply. To the other inner zone is connected a control-electrode.

The outer p-zone can be made in common for these semiconductors during the integration (FIGS. 7b and 7c), as well as the adjacent n-zone. The screening rings are dimensioned so that the resistance between the rings and the part of the common n-zone participating in the thyristor effect of the corresponding pnpn semiconductor element (shown in broken lines in FIG. 7b for the central semiconductor) is equal to the resistor $R'_2$, by which this useful part has to be connected to earth. It is therefore not necessary to provide external resistors. In this embodiment, moreover, the screening region is adjacent a pn-junction, on either side of which the same potential prevails.

On the basis of the preceding example it can be illustrated by the next example how the circuit of FIG. 8a can be diffused into one silicon wafer. This circuit comprises two pnpn semiconductors and two diodes. In order to integrate these diodes readily with the pnpn-elements, an n-zone will be provided, in addition, on the p-side of each diode, said zone being connected through a resistor $r''$ to earth, and an additional n-zone directly connected to earth. A circuit as shown in FIG. 9a is then converted into a circuit as shown in FIG. 9b. In semiconductor technology it is known that, if the resistor $r''$ is made sufficiently small, the pn-junctions between the zones 20 and 21, and 19 and 22 remain always blocked and that each new element thus formed will not operate as a thyristor, so that for example the two initial zones 18 and 19 continue to co-operate as diodes.

Figure 8:
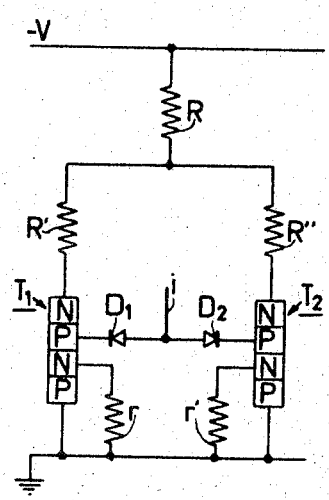
FIG. 8 shows a particular circuit arrangement to which the invention may be applied.
Figure 9A:
FIG. 9 shows an arrangement in which diodes are replaced by four-zone semiconductors.
Figure 9B:
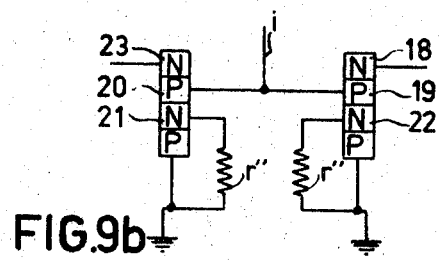
Figure 10A:
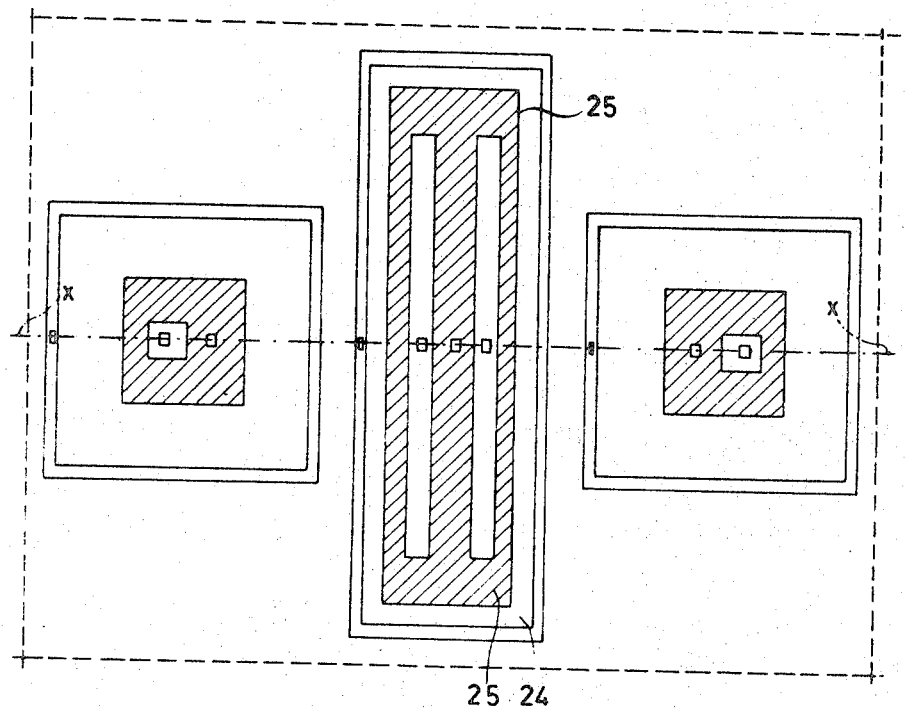
FIG. 10 shows an embodiment of the arrangement of FIG. 8 according to the invention.
Figure 10B:
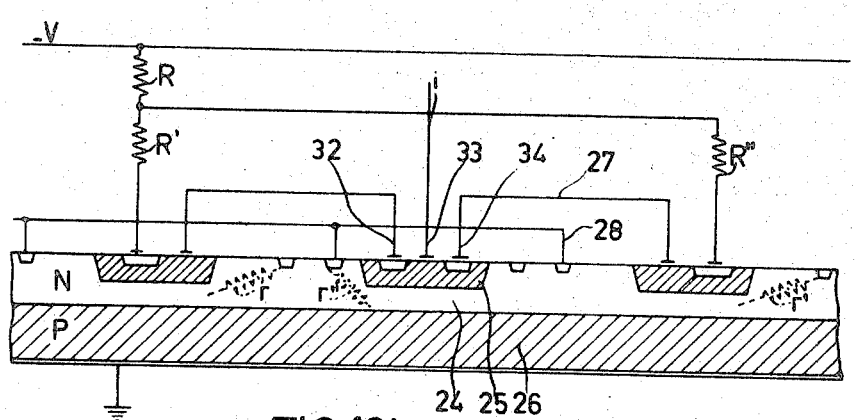

The semiconductor elements of FIG. 9b can therefore be integrated together with the two pnpn-elements of FIG. 8 in a silicon wafer, whilst the idea of the invention is carried out. There could be expected four screening rings, since there are four semiconductor elements. The practical embodiment is shown in FIG. 10. FIG. 10a is a plan view having only three screening rings. Only one screening ring is applied around the two diodes. This is sufficient, since the n-zone 21 (FIG. 9b) is at the same potential as the n-zone 22 via a resistor $r''$. In the integrated embodiment those parts of the common n-zone 24 (FIG. 10b) which replace the zones 21 and 22, may be directly interconnected in a resistive sense, that is to say without the connection being established across a region at earth potential. The connection itself has to be linked in a resistive manner to earth. This is obtained by means of the common screening ring.

The zones 19 and 20 may also be joined to form a common zone (see FIG. 9b), into which the zones 18 and 23 are diffused. Consequently, there is no insulation problem between the two diodes, but it does between the subgroup of the two diodes and the further elements. Therefore, the two diodes are surrounded by a screening ring. This ring is very closely adjacent this double diode and the double diode is elongated in order to render the resistor $r''$ sufficiently small. If this resistor were too high, a thyristor effect might appear in the four-layer combination between the lower side and one of the two n-zones diffused into the zone 25 (see FIG. 10). The part of the zone 24, located between the zones 25 and 26 would participate in this thyristor effect and the charge carriers would pass through said part.

In order to avoid this thyristor effect, the resistor $r''$ between said part and the conductor is made sufficiently small. The current passing through this four-layer combination and required for maintaining the thyristor operation is too high so that it cannot be supplied by the normal operational potentials also used for the adjacent pnpn-elements.

For these adjacent pnpn-elements the values of the resistors $r$ and $r'$ may be chosen so that the minimum current at which this element remains conducting is of the same order of magnitude as the conduction current at the nominal value of the supply voltage.

This will be accounted for as follows: The circuit of FIG. 8 according to the invention as is shown in FIG. 10 is intended for use as a flip-flop circuit and for this purpose the values of the voltage V and the resistor R are such that the current can be maintained only by one of the two pnpn-elements (for example the element $T_1$ in FIG. 8), so that this element is substantially at earth potential. A signal capable of changing this circuit to the other bistable state, is applied to the input $i$, which is thus at a potential lying between $-V$ and earth potential for a short time, and which subsequently drops to a strongly negative rest potential (preferably $-V$). Owing to this input signal $D_2$ becomes conducting, whereas $D_1$ remains cut off. $T_2$ becomes conducting. As a result the voltage drop across the resistor is so great that the current of $T_1$ decreases considerably and drops below the minimum value $I_h$, at which this current can be maintained in the absence of an input signal. In the absence of the parallel combination of $r$ and $r'$ this minimum current $I_h$ is, however, negligible with respect to the nominal flow of current and this minimum current is always quite different for the individual elements. It is known (see, for example, the article of A. W. Aldrich and N. Holonyak "Two-Terminal Asymmetrical and Symmetrical Silicon Negative Resistance Switches" in "Journal of Applied Physics," November 1959, pages 1820–1821) that the value $I_h$ can be increased by connecting a resistor $r$ or $r'$ in parallel with one of the junctions polarised in the forward direction. Then the value $I_h$ mainly depends upon the value $r$ or $r'$. In order to construct flip-flops with reproduceable characteristics and to allow series production thereof the presence of the resistors $r$ and $r'$ is therefore required. Then the value $I_h$ depends mainly upon the values $r$ or $r'$. Consequently, in order to construct a flip-flop of predictable characteristics and to enable mass production thereof, the provision of the resistors $r$ and $r'$ is necessary. The values of $r$ and $r'$ are chosen so that $I_h$ is of the same order of magnitude as the nominal conduction current. When the invention is applied, these resistors are automatically integrated in the semiconductor body.

It should be noted that analog control-signals might as well be applied to the two n-zones, as is illustrated in FIG. 11, but in this case the difference of potential between the two zones with a blocked semiconductor and a conducting semiconductor is fairly small, so that the possibility of control of the two diodes is unnecessarily restricted.

In the embodiment of FIG. 10 the part of the external circuitry comprising only short-circuits between the zones of the semiconductor (the short-circuits 27 between the diodes and the corresponding pnpn-elements and also the earth connections 28) can be applied to the semiconductor body itself (for example by vapour deposition). In this way the external circuitry of one flip-flop is reduced to the resistors R, R' and R" with their common connection to the voltage source $-V$. If a sequence of flip-flop circuits are integrated in one body, they can be connected to a corresponding sequence of similar external circuits applied to a substrate, so that also the external circuit of each flip-flop may be made in series. The uniform production of the semiconductors of a flip-flop in a semiconductor body and the uniform production of the associated external circuits the interconnection thereof is also suitable for mass production.

For the construction of other logical circuits or storage circuits integrated pnpn-elements in which one of the junctions polarised in the pass direction is shunted by a resistor integrated in accordance with the invention may be advantageous.

The flip-flops shown in FIG. 10 can now be joined to form binary counters. For this purpose a pulse generator is connected between the output of one flip-flop and the input $i$ of the next flip-flop. This pulse generator supplies, in the rest position, a strongly negative potential (for example, $-V$) and, during the pulse time, a potential lying between $-V$ and earth potential. The output potential of the flip-flop is derived from the point where one of the two elements $T_1$ or $T_2$ (FIG. 8) is connected to the corresponding resistor R' or R" (for example, the connection of $T_1$ to R'). The pulse generator then supplies a pulse when the flip-flop returns to one of the two bistable states (for example, $T_1$ conducting and $T_2$ cut off: then a sloping flank of potential is at the input of the pulse generator, which thus supplies a pulse to the next-following flip-flop).

For a simple representation of the following circuit arrangements they are symbolised as in FIG. 12. A pnpn-element diffused as described with reference to FIG. 7, illustrated in FIG. 12a–1 is symbolically represented in FIG. 12a–2, where the numerals of the contacts are again 29, 30, 31. In a similar manner FIG. 12b–2 shows the symbols of a double diode, diffused as indicated in FIG. 10 and illustrated in FIG. 12b–1. The contacts are here again 32, 33 and 34. The earth contacts are omitted, since they only serve for insulation and do not play a role in the operation of a scheme.

Instead of two diodes, sometimes only one diode is required, which is constructed in the same manner as illustrated in FIG. 12c–1 and represented symbolically as in FIG. 12c–2. Structurally it is similar to a conventional pnpn-element, but also in this case the screening is arranged very closely around the element so that the minimum current $I_h$, at which this element might operate as a thyristor, lies far above the nominal supply current.

Figure 13:
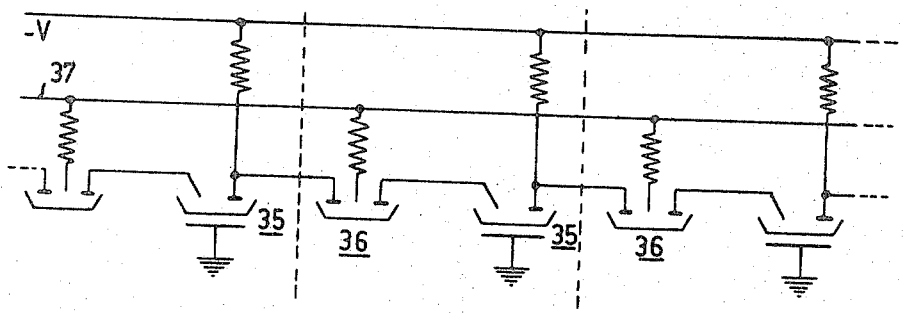
FIG. 13 shows a ring counter comprising elements according to the invention.

Three stages of a ring counter are symbolically represented in FIG. 13. Each stage comprises one pnpn-element 35 and one double diode 36. The current supplied by $-V$ such that only one pnpn-element of the whole ring counter can be held in the conducting state. In the rest position the signal input 37 is at the potential $-V$, so that all double diodes are cut off. It is assumed that the pnpn-element 35 of the central stage is conducting and that a pulse is applied to the signal input, so that the potential thereof is brought to a value lying, for example, between earth potential and $-V$. All left-hand parts of the double diodes 36 will thus become conducting, with the exception of the double diode in the right-hand stage. The right-hand part of the diode has become conducting and the pnpn-element of this stage becomes conducting, whereas the semiconductor of the central stage is cut off. With a satisfactory control of the pulse duration the appearance of the pulse at the signal input 37 ensues that the pnpn-element of the next stage becomes conducting.

Figure 14:
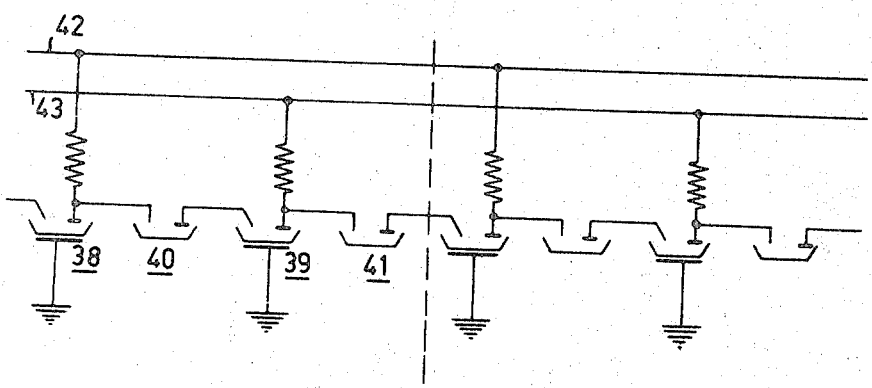
FIG. 14 shows a shift register comprising elements according to the invention.

FIG. 14 represents symbolically two stages of a shift register. Each stage comprises two pnpn-elements (38 and 39) and two diodes (40 and 41). The pnpn-elements are connected to two different supply conductors 42 and 43. The potential of each conductor has two alternating values and the pnpn-element can be held in the conducting state at one value $V_1$, whereas it is not conducting at the other value $V_2$, even in the presence of a control-current. The other conductor is also at these two alternating potential values, but each time the value not present at the first conductor.

If the conductor 42 has the value $V_1$, the conductor 43 has the value $V_2$. If it is assumed that the element 38 is conducting, the element 39 will receive a control-current, but the conductor 43 is at the potential $V_2$, so that the element 39 cannot be conducting. At the change-over of the potentials of the conductors 42 and 43 this control current drops exponentially, but not sufficiently rapidly for preventing the element 39 from becoming conducting. The element 38 is then cut off. If the element 38 were not conducting, the element 39 would, of course, not become conducting either at the change-over of the supply potentials. It will be apparent that two change-overs are required for a shift of information from one stage to the next one.

Figure 15A:
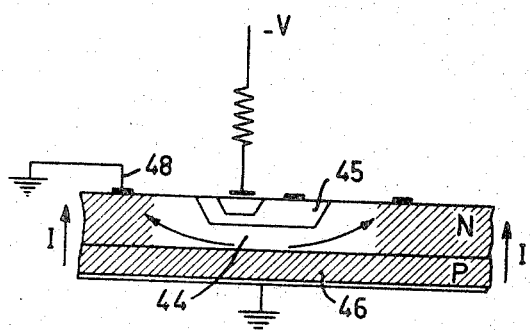
FIG. 15 shows a separate pn-pn element.
Figure 15B:

In all these arrangements all semiconductor elements may, if desired, be integrated in the same semiconductor body, but the pnpn-elements described above with reference to FIG. 7 with the screening ring may be used, alternatively, as electronic switches and they are particularly suitable for circuitries as described above. Such a separate element comprises a semiconductor body having two regions of opposite conductivity types, each occupying one side of the body, whilst in the region on one side a first zone of opposite conductivity type is provided, in which a second zone is provided, which is of a conductivity type opposite that of the first zone. FIG. 15a shows such an element in which on said side the first zone is surrounded at the surface by a good conductor and is connected to the other side of the body, so that in the region on the upper side a resistor is obtained, which is in parallel with the pn-junction between the regions of either side. The screening ring 48 around the whole periphery of the wafer is at constant earth potential (this region is cross-hatched in FIG. 15a). Then no peripheral currents I will occur, which might render the characteristics of the element unreliable. When the element is conducting, the minority carriers are moved from the zone 45 to the zone 44, where they become majority carriers, which are dispersed in the direction of the arrows of FIG. 15a. The region 46 on the lower side of the element has the form of a layer extending over a larger surface than that surrounded by the conductor. This region 46 is at the same constant potential as the conductor 48. As a result a potential valley is formed in the zone 44, as is shown in FIG. 15b, the potential being at a minimum at the centre. The pn-junction of the zones 44 and 46 forms the optimum passage at this place. Also the emission of the majority carriers from the zone 46 to the zone 44, where they become minority carriers, is concentrated at this centre beneath the zone 45. During their passage through the zone 44 to the zone 45 they are concentrated by said potential valley, so that the thyristor effect is more concentrated at said centre. Thus the peripheral effects which impeach the prediction of the characteristics of a pnpn-element are drastically reduced.

In general, with a semiconductor body, whose lower and upper sides are formed of two regions of relatively opposite conductivity types, the elements being integrated on the upper side, each element may be surrounded on the same side by an annular conductor and connected to an external, preferably constant potential, whilst inside the ring each element is at the operational potential. In the ring a potential peak or potential valley will thus be obtained, so that the pn-junction between the regions on the lower and upper sides is rendered conducting to the optimum at the centre of each ring and the semiconductor effect is concentrated at said centre. In the p-type zone of FIG. 4b for example, potential peaks are formed, concentrating the diode effect at the centre of the mesh of the network.

Figure 16:
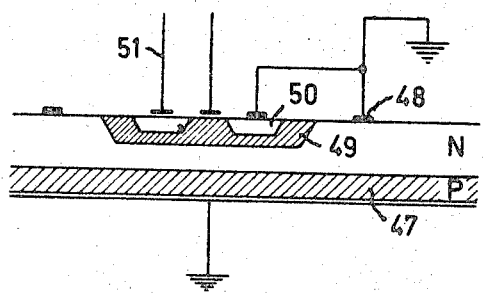
FIG. 16 shows an integrated pn-pn element and a Zener diode also integrated.

Since in the pnpn-element of FIG. 7 a good conductor is always provided on the upper side at the potential of the lower side this element can easily be transformed into a new pnpn-element, whose voltage required for rendering it conducting without control-current is materially lower. The circuits operating with these new elements require therefore considerably lower operational voltages. A measure for obtaining this result with a Zener diode between the first and the third zones of the pnpn-combination is known from the article: "IC Simulates Four-Layer Diode" in Electronics, Jan. 10, 1966, page 192. This Zener diode can be readily integrated in the pnpn-elements and connected to the first zone 47 owing to the presence of the conductor 48 on the upper side (FIG. 16). Steps are taken to ensure that the pn-junction between the zones 49 and 50 breaks down at a voltage which is considerably lower than the voltage to be applied to the terminal 51 for rendering the pnpn-combination between this terminal and the lower side conducting without a control-current at the terminal 52 or without charge carriers from the zone 50. At the breakdown of this pn-junction charge carriers are introduced into the zone 49 which render said pnpn-combination conducting.

It will be apparent that in all arrangements having pnpn-elements described above these elements may be transformed into elements as shown in FIG. 16, even into the separate structure of FIG. 15.

Figure 17:
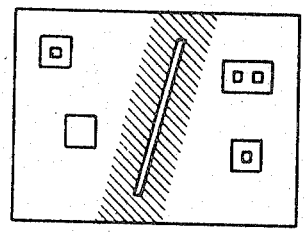
FIG. 17 shows a semicondutor body in which two subgroups of semiconductor elements are electrically separated from each other by a good conductor.

It may furthermore be said, in general, that, if an electrical connection across the semiconductor body between two groups of elements of said body is not desired, these two groups can be separated by a screening region produced by a conductor in or on the semiconductor body at a potential which is independent of the working potentials of said elements (FIG. 17). This conductor may be provided in or on the body. Several conductors may be provided on both sides. These conductors will preferably be arranged around the elements to be separated, since then a concentration of the semiconductor effect is possible. These conductors may be applied in the form of closed rings around each element and may have any shape and may even be partly interrupted provided they surround the element by a closed screening region. A plurality of rings may be united to form a network. This is shown by way of example in FIG. 40. However, it is not necessary to provide an element in each mesh of this network and a plurality of elements may be arranged inside one ring, as for example the double diode of FIG. 10.

The conductors are preferably arranged on the semiconductor body, where they may be provided simultaneously with the contacts to be provided on the other zones. Therefore, no additional operation is required. The rings thus establish a satisfactory ohmic contact with the subjacent zone and they may consist of vapour-deposited aluminium of of the same nature and the same thickness as the other contacts.

The conductor may also be formed by a strongly conductive region in or on the surface of the semiconductor body, where the conductivity is enhanced by the diffusion of a strong concentration of impurities. However, in this case it has to be ensured that the transition from this strongly conductive region to the remainder of the body is also purely ohmic.

Where the conductor on the upper side has to be at the same potential as the region on the lower side, the through-connection may be established externally or in the body itself. For this purpose an aperture is etched on the upper side in the body, the bottom of which aperture lies in the region on the lower side. From there a conductive extension may be provided to the conductor on the upper side. This extension is preferably together with the conductor (for example by vapour deposition).

Now the manufacture of one of the integrated circuits will be described.

The screening conductor can be applied to the semiconductor by means of the conventional techniques. By way of example it will be described how a semiconductor body with pnpn-elements as shown in FIG. 7 is manufactured. In this example, in addition, a strongly doped annular n-type zone is provided beneath the screening conductor for establishing a satisfactory ohmic contract between the aluminium conductor and the epitaxial n-zone.

The manufacture starts from a $250/\mu$ thick semiconductor wafer of p-type silicon (resistivity 0.03 ohm cm.), on which a $12/\mu$ thick n-type layer (0.1 ohm cm.) is applied epitaxially. After the oxidation of this wafer apertures are etched in a conventional manner in the oxide layer, through which apertures boron is diffused for obtaining a base zone of p-type material. Then again apertures are etched in the oxide layer formed during the diffusion of the boron. Through said apertures is then diffused phosphorus, the collector zone of n-type material being thus obtained for each element, whilst simultaneously the annular n-type zone is diffused. Since the depth and the concentration of this annular zone are not critical, these two diffusions of n-zones may be carried out simultaneously. The base and the collector zone have a square shape with a side of $60/\mu$ and $30/\mu$ respectively. The ring also has a rectangular shape with a side of $120/\mu$; the width is $10/\mu$. The base zone penetrates down to a distance of $2/\mu$ from the pn-junction between the p-type substrate and the epitaxial n-layer.

Apart from the annular n-zone a number of non-insulated conventional elements are thus obtained. The aluminium contacts have still to be provided on the upper side on the base and collector zones, as well as the annular aluminium conductor with its contact. The latter is obtained simultaneously with the application of the aluminium contacts on the base and the collector zones. For this purpose a $1/\mu$ thick aluminium layer is deposited on the upper side from the vapour phase.

This layer is selectively etched in a conventional manner, for example, in a bath of concentrated phosphoric acid, so that only the aluminium contacts and the annular conductors are left.

The invention is not at all restricted to the circuit arrangement shown here by way of example. All arrangements employing pnpn-semiconductors as storage elements are suitable for application of the invention, since the invention provides a combination of various advantages: the relative insulation of the zones, the reproduceability of $I_h$, the automatic introduction of the resistance to which this reproduceability is due, the concentration of the semiconductor effect and, if an additional zone is diffused as a Zener diode, the reduction of the working voltage.

It will furthermore be apparent that the invention is not restricted to the embodiments shown herein. The invention may be applied to any element on a wafer shaped semiconductor body, obtained by known techniques of diffusion and etching and vapour-deposition. It is particularly advantageous that these steps can be carried into effect simultaneously with other measures to be taken (for example common diffusion of the n-zones, common application of rings and contacts, so that the number of processes is not increased for obtaining the advantages of the invention. If particularly certain zones of the elements on the semiconductor body have to be directly connected to each other or to a conductive ring (see for example FIG. 16), this through-connection may also be established by aluminium conductors made during the same processes as those for the other aluminium contacts.

What is claimed is:

1. An electronic circuit arrangement comprising a body including a common wafer-shaped semiconductor, integrated with the semiconductor plural circuit elements, and means for electrically isolating at least two of the circuit elements in at least a common part of the semiconductor, said isolation means comprising a metallic conductor disposed on the wafer surface in a position lying between the circuit elements to be isolated and substantially surrounding at least one of said circuit elements, the portion of said semiconductor extending between the metallic conductor and each of the circuit elements to be isolated constituting an electrical resistance, the metallic conductor forming an ohmic connection with all the semiconductor body portions extending underneath it and between the circuit elements to be isolated, and means for connecting the metallic conductor to an external potential.

2. An electronic circuit arrangement as set forth in claim 1 wherein the semiconductor comprises an upper side of one type conductivity separated by a p-n junction from a lower side of the opposite type conductivity, said lower side being common to a plurality of said circuit elements, said metallic conductor being connected to a potential at which said p-n junction, in the proximity of the metallic conductor, is unbiased or biased in the blocking direction.

3. An arrangement as set forth in claim 2 wherein conductors are provided on the surface of the upper side and connected to some of the circuit elements and means are provided for directly connecting the lower side to at least one of the conductors on the upper side.

4. An electronic circuit arrangement as set forth in claim 1 wherein means are provided for connecting the metallic conductor to a fixed potential.

5. An arrangement as set forth in claim 4 wherein the fixed potential is ground potential.

6. An electronic circuit arrangement as set forth in claim 1 wherein the metallic conductor has the shape of a closed ring on the surface surrounding said one circuit element.

7. An electronic circuit arrangement as set forth in claim 6 wherein the isolation means comprises a mesh network some of the meshes of which each surround and isolate at least one of the circuit elements.

8. An electronic circuit arrangement as set forth in claim 1 wherein the metallic conductor is interrupted in at least one place.

9. An electronic circuit arrangement as set forth in claim 1 wherein interconnections between the circuit elements are provided, said interconnections being metallizations on the surface of the semiconductor forming ohmic contacts thereto, said interconnect metallizations having the same composition and thickness as that of the isolation metallic conductor.

10. An electronic circuit arrangement comprising a body including a common wafer-shaped semiconductor, integrated with the semiconductor plural circuit elements, and means for electrically isolating at least two of the circuit elements in at least a common part of the semiconductor, said isolation means comprising an annular metallic conductor on the semiconductor surface and forming an ohmic connection thereto and substantially surrounding at least one of said circuit elements and extending between it and the other circuit element from which it is to be isolated, the portion of said semiconductor extending between the electrical conductor and each of the circuit elements to be isolated constituting an electrical resistance, and means for connecting the metallic conductor to an external potential, said one circuit element comprising a 4-zone device in which the zones alternate in conductivity type, two of said zones being located adjacent to and extending to the said semiconductor surface with one zone being inside the other zone.

11. A circuit arrangement as set forth in claim 10 and including means for deriving a signal from the one inside zone, and means for applying a signal to the other zone.

12. A circuit arrangement as set forth in claim 10 wherein an additional zone is provided inside said other zone, said additional zone extending to the said semiconductor surface and being spaced from but of the same conductivity type as that of the said one zone, means being provided for connecting said additional zone to the said annular conductor, and means for applying a voltage across the 4-zone device, said junction between said additional zone and said other zone having characteristics producing a Zener breakdown at a potential below said voltage applied across the 4-zone device.

13. An arrangement as set forth in claim 10 wherein resistor means is provided for connecting said one zone to one terminal of a supply source, and means are provided for connecting the furthest zone from said one zone and the annular conductor to the other terminal of the supply source.

14. An arrangement as set forth in claim 10 wherein plural 4-zone devices are provided within the semiconductor wafer, the two zones other than said one and said other zones of each said devices being in common regions of said wafer.

15. An arrangement as set forth in claim 7 wherein the circuit element within one of the meshes comprises a double diode comprising a first zone extending to the wafer surface and of one conductivity type and within the first zone second and third spaced zones also extending to the wafer surface and of the opposite conductivity type.

16. An electronic circuit arrangement comprising a body including a common wafer-shaped semiconductor, integrated with the semiconductor plural circuit elements, and means for electrically isolating at least two of the circuit elements in at least a common part of the semiconductor, said isolation means comprising a metallic conductor on the surface of said body and forming an ohmic connection thereto and disposed in a position lying between the circuit elements to be isolated and substantially surrounding at least one of said circuit elements, the portion of said semiconductor extending between the metallic conductor and each of the circuit elements to be isolated constituting an electrical resistance, and means for connecting the metallic conductor to an external fixed potential, said semiconductor wafer comprising a region of one conductivity type adjacent the surface opposite that containing the isolation means, said region extending over an area far exceeding that encompassed by the isolation means.

17. An arrangement as set forth in claim 16 wherein said one circuit element comprises nested surface zones of opposite type conductivity adjacent the surface containing the isolation means, and means are provided connecting the said region to said external fixed potential.

18. An electronic circuit arrangement comprising a body including a common wafer-shaped semiconductor, integrated with the semiconductor plural circuit elements, and means for electrically isolating at least two of the circuit elements in at least a common part of the semiconductor, said isolation means comprising a metallic conductor disposed on the wafer surface in a position lying between the circuit elements to be isolated and substantially extending across the semiconductor wafer, the portion of said semiconductor extending between the metallic conductor and each of the circuit elements to be isolated constituting an electrical resistance, the metallic conductor forming an ohmic connection with all the semiconductor body portions extending underneath it, and means for connecting the metallic conductor to an external fixed potential.

19. A circuit arrangement as set forth in claim 2 wherein means are provided for applying to the element inside the metallic conductor voltages at which a potential peak or valley is established in the semiconductive region inside the metallic conductor such that the central part of the p-n junction inside the metallic conductor is more strongly conductive than parts thereof lying closer to the metallic conductor.

20. An electronic circuit arrangement comprising a body including a common wafer-shaped semiconductor, integrated with the semiconductor plural circuit elements, and means for electrically isolating at least two of the circuit elements in at least a common part of the semiconductor, said isolation means comprising a strongly electrically conductive surface region of the semiconductor wafer in a position lying between the circuit elements to be isolated and substantially surrounding at least one of said circuit elements, the portion of said semiconductor extending between the surface region isolation means and each of the circuit elements to be isolated constituting an electrical resistance, the isolation means surface region being of the same type conductivity as that of the semiconductor body portions extending underneath it and between the circuit elements to be isolated and forming a continuous ohmic connection with all the semiconductor body portions extending underneath it, and means for connecting the said surface region to an external potential.

References Cited

UNITED STATES PATENTS

| 2,994,834 | 8/1961 | Jones | 307—303 |
| 3,115,581 | 12/1963 | Kilby | 307—279 |
| 3,173,028 | 3/1965 | Philips et al. | 307—279 |
| 3,200,266 | 8/1965 | Abraham | 307—303 |
| 3,230,388 | 1/1966 | Hounsfield | 307—303 X |

JOHN S. HEYMAN, Primary Examiner

U.S. Cl. X.R.

307—213 221, 223, 229, 279, 280, 284; 317—221, 235

PO-1050
(5/69)

UNITED STATES PATENT OFFICE
CERTIFICATE OF CORRECTION

Patent No. 3,488,528       Dated January 6, 1970

Inventor(s) J. C. J. O. E. EMOND

It is certified that error appears in the above-identified patent and that said Letters Patent are hereby corrected as shown below:

Col. 3, line 14, "sfor" read --for--;

Col. 5, line 30, last word "The" read --This--;

Col. 6, line 23, paragraph should be indented;

Col. 7, line 50, "complete" read --completely--;

Col. 9, line 28, "A.W." read --R.W.--;

Col. 10, line 40, "-V such" read -- -V is such--;

Col. 12, line 41, "of of" read --of--;

Col. 12, line 67, "contract" read --contact--;

Delete " / " before u's : Col. 12, line 71; Col. 12, line 73;

Col. 13, line 11, line 12, line 13, line 14, line 23;

Col. 13, line 10, "base" read --base zone--;

Col. 13, line 49, "invention." read --invention).--.

Signed and sealed this 28th day of July, 1970.

(SEAL)
Attest:

Edward M. Fletcher, Jr.
Attesting Officer

WILLIAM E. SCHUYLER, JR.
Commissioner of Patents